United States Patent [19]

Fünfschilling et al.

[11] Patent Number: 5,319,478
[45] Date of Patent: Jun. 7, 1994

[54] LIGHT CONTROL SYSTEMS WITH A CIRCULAR POLARIZER AND A TWISTED NEMATIC LIQUID CRYSTAL HAVING A MINIMUM PATH DIFFERENCE OF $\lambda/2$

[75] Inventors: Jürg Fünfschilling, Basel; Martin Schadt, Seltisberg, both of Switzerland

[73] Assignee: Hoffmann-La Roche Inc., Nutley, N.J.

[21] Appl. No.: 690,894

[22] PCT Filed: Oct. 26, 1990

[86] PCT. No.: PCT/CH90/00251

§ 371 Date: Jun. 20, 1991

§ 102(e) Date: Jun. 20, 1991

[87] PCT Pub. No.: WO91/06889

PCT Pub. Date: May 16, 1991

[30] Foreign Application Priority Data

Nov. 1, 1989 [CH] Switzerland .......... 3948/89

[51] Int. Cl.⁵ .......... G02F 1/133; G02F 1/1335
[52] U.S. Cl. .......... 359/53; 359/65
[58] Field of Search .......... 359/65, 53

[56] References Cited

U.S. PATENT DOCUMENTS

| | | | |
|---|---|---|---|
| 3,807,831 | 4/1974 | Soref | 359/65 |
| 3,960,438 | 6/1976 | Bonne et al. | 359/65 |
| 4,032,218 | 6/1977 | Scheffer | 359/65 |
| 4,073,571 | 2/1978 | Grinberg et al. | 359/53 |
| 5,235,443 | 8/1993 | Barnik et al. | 359/53 |
| 5,243,451 | 9/1993 | Kanemoto et al. | 359/53 |

FOREIGN PATENT DOCUMENTS 63-25626 2/1988 Japan.

*Primary Examiner*—Anita P. Gross
*Attorney, Agent, or Firm*—George M. Gould; George W. Johnston

[57] ABSTRACT

A new mode of operation is proposed for light control systems consisting of a combination of liquid crystal cells and polarizers. The direct operation of liquid crystal cells with circularly-polarized light is advantageous in many respects. The circularly-polarized light is produced either with conventional circular polarizers or with monomeric or polymeric cholesteric liquid crystals. The new mode of operation is possible under certain conditions for all liquid crystal cells which hitherto had to be operated with linearly-polarized light.

12 Claims, 1 Drawing Sheet

LIGHT CONTROL SYSTEMS WITH A CIRCULAR POLARIZER AND A TWISTED NEMATIC LIQUID CRYSTAL HAVING A MINIMUM PATH DIFFERENCE OF λ/2

The invention relates to light control systems consisting of a combination of liquid crystal cells and polarizers.

In conventional arrangements with liquid crystal cells, they are usually operated with one or more linear polarizers. Where circularly-polarized light was available and had to be controlled, it was converted to linearly-polarized light, e.g. with a λ/4 plate and, if required, was re-converted to circularly-polarized light after the liquid crystal cell again with a λ/4 plate. The rotary or TN (=Twisted Nematic) cell, in particular, requires linearly-polarized light for its mode of operation in which the direction of polarization of the incident light is rotated with the helix structure in the switched-off state (wave-guiding mode).

It has now been found that there is one type of operation possible and in many respect advantageous, i.e. direct operation of liquid crystal cells with circularly-polarized light, the circularly-polarized light being produced either with conventional circular polarizers or with monomeric or polymeric cholesteric liquid crystals.

The invention is accordingly characterised in that light control systems of the type referred to above are provided with means for supplying circularly-polarized light to liquid crystals.

The invention is explained hereinafter with reference to exemplified embodiments illustrated in the drawings wherein.

Figure 1:
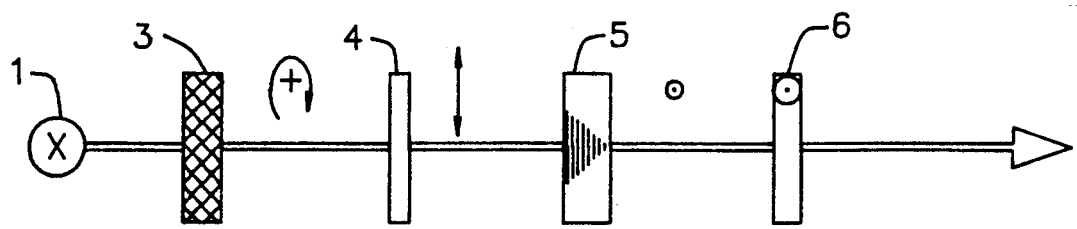
FIG. 1 shows an arrangement with a TN-cell in the conventional mode of operation.

The arrangement shown in FIG. 1 comprises a light source 1, whose light is converted into dextrorotatory circular light with a circular polarizer 3. The latter is followed by a λ/4 plate 4, which converts the circularly-polarized light into linearly-polarized. The direction of polarization is indicated by a double arrow. The λ/4 plate 4 is followed by a TN cell 5 which, in the switched-off state, rotates the direction of polarization of the light through 90° in known manner. This rotated light can pass without attenuation through a linear polarizer 6 following the TN cell 5 and turned through an angle of 90° with respect to the direction of polarization before the cell. If voltage is applied to the cell 5, the rotatory effect is eliminated and the light, which is now not rotated, cannot pass the polarizer 6. The TN cell 5 thus operates in the conventional mode, in which the direction of polarization of the incident light is rotated in the switched-off state (wave-guiding mode).

In order further to increase the polarization quality after the λ/4 plate in this arrangement, a low-polarization linear polarizer can be incorporated between the λ/4 plate and the TN cell to improve the linear polarization without appreciably affecting the brightness of the system.

Figure 2:
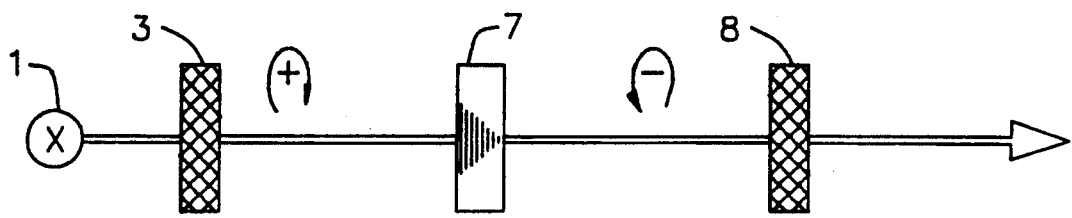
FIG. 2 shows an arrangement with a TN-cell in operation with circularly-polarized light in transmission mode.

FIG. 2 shows another mode of operation. The dextrorotatory circularly-polarized light produced as described above is fed directly to a TN cell 7. For this mode of operation, the cell must have a minimal optical path difference of $\delta = \Delta n \cdot d = \lambda/2$ between the switched-off and switched-on states. If this condition is satisfied, the direction of rotation of the circularly-polarized light changes as it passes, i.e. in this case from dextrorotatory (+) to levorotatory (−). The TN cell 7 is followed by another circular polarizer 8 which is in this case transparent to the opposite direction of rotation to the first circular polarizer 3, i.e. levorotatory. When the TN-cell 7 is switched on and thus becomes optically uni-axial, it does not affect the state of polarization of the light, so that it is blocked by the circular polarizer 8.

Any known form of circular polarizers may be used for the circular polarizer 8, e.g. including wavelength-selectively reflecting low-pitch cholesteric coatings. The light reflected by them is, of course, circularly polarized. In color projection systems this light is controlled by downstream liquid crystal cells. It is advantageous in such circumstances if it is possible to dispense with prior conversion to linearly-polarized light.

As already stated, operating TN cells with circularly-polarized light gives a distinct shift of the control voltages required towards lower values. It is also possible to produce steeper voltage-transmission characteristics of the kind required, for example, for multiplex operation.

The arrangements shown in FIGS. 1 and 2 yield a positive contrast if the principle is used to construct display cells. Negative contrast is possible in each case without difficulty and in fact it is possible in FIG. 1 in known manner by rotating the linear polarizers at the outlet side through 90°. In FIG. 2 this is achieved by using a dextrorotatory circular polarizer instead of a levorotatory.

Figure 3:
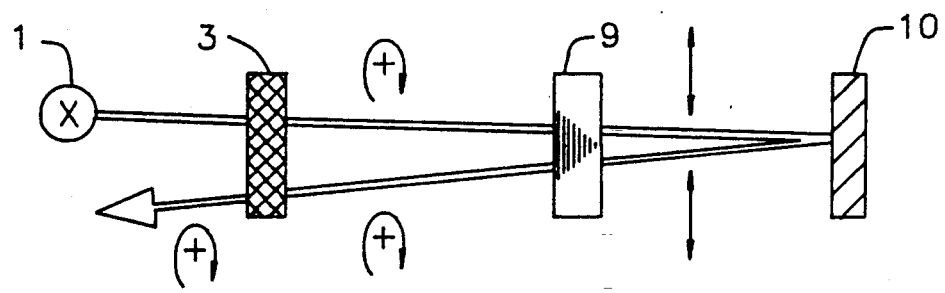
FIG. 3 is a similar arrangement to FIG. 2 but in reflection mode.

The arrangements shown in FIG. 3 is also based on the fact that, as in FIG. 2, circularly-polarized light is fed directly to a TN-cell 9. Unlike the TN-cell 7 in FIG. 2, however, the TN-cell 9 has a minimal optical path difference of $\delta = \lambda/4$ between the switched-off and switched-on states. Thus in the switched-off state it acts as a λ/4 plate which converts circularly-polarized light to linearly-polarized. Cell 9 is followed by a reflector 10 which reflects the linearly-polarized light back to the cell 9. For symmetry reasons cell 9 converts the linear-polarised light back into circularly-polarized light which can pass the circular polarizer 3. In the switched-on state the dextrocircularly-polarized incoming light passes the TN-cell. This changes the direction of rotation on reflection at the mirror 10 so that the now levo-circularly-polarized reflected beam can no longer pass the circular polarizer 3. The reflector 10 can also be directly integrated on the inside of the rearward substrate of the TN cell.

Instead of a TN-cell, it is possible to use for this arrangement any other liquid crystal cell giving the required optical path difference between the switched-off and switched-on states. Other liquid crystal cells with a helical molecular arrangement, for example the supertwist, SBE and STN cells particularly may be used. Liquid crystal cells with an untwisted structure can also be used in this more novel mode.

Figure 4:
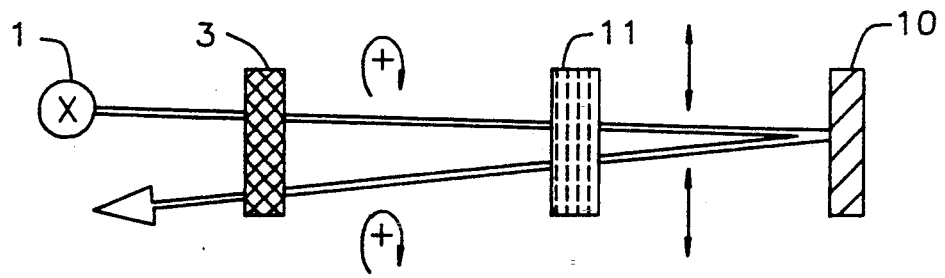
FIG. 4 shows an arrangement with a parallel-oriented cell in reflection mode with circularly-polarized light.

Thus FIG. 4 shows an arrangement operating in reflection mode comprising a planar-oriented nematic cell 11 with positive dielectric anisotropy of the liquid crystal i.e. Δε>0. This arrangement corresponds to the above described alternative with a TN-cell whose optical path difference between the switched-off and switched-on states is $\delta = \lambda/4$. Thus in the switched-off state the cell acts as a $\lambda/4$ plate, i.e. the circularly-polarized light is converted to linearly-polarized light. After reflection at a mirror 10 the reverse operation takes place, i.e. the linearly-polarized light is again converted to circularly-polarized in the $\lambda/4$ cell, passes the circular-polarizer 3 without obstruction and is available at the output with the full intensity. If voltage is applied to the cell 11 so that it becomes optically uni-axial it does not affect the state of polarization of the light. Thus behind the cell dextrocircularly-polarized light passes to the reflector 12 which, as already stated, changes its direction of rotation on reflection. This light which is levocircular after reflection passes, without being affected by the planar cell 11, to the circular polarizer 3 and is blocked by the latter.

An advantage of this reflective configuration too is that the reflector 10 may be disposed directly on the substrate or backwall of the liquid crystal cell so that light-absorbing structures, for example thin-film transistors, etc., are situated behind the reflector and thus do not reduce the aperture or brightness of the active surface of the image element. Another important advantage is that the path of the light after the liquid crystal to the reflector and back is shorter, because there is no intermediate glass substrate, so that with an inclined incident light, i.e. a large viewing angle, the parallax error is smaller than in conventional arrangements.

Figure 5:
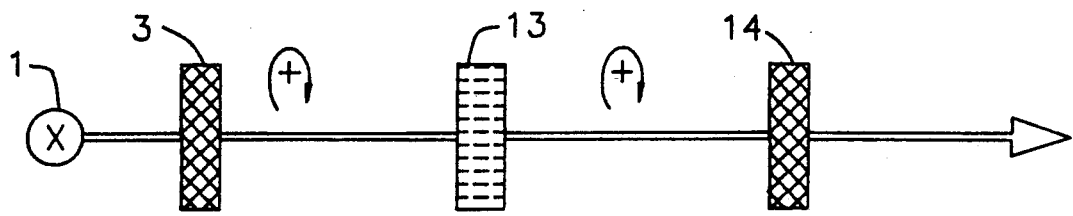
FIG. 5 shows an arrangement with a vertically oriented DAP cell in operation with circularly-polarized light.

In the arrangement shown in FIG. 5, the circularly polarized light impinges on a DAP-cell 13 which is distinguished in that it is uni-axial in the switched-off state and thus allows light to pass unaffected. The polarization is thus the same before and after the cell. After the cell 13 there is disposed a second circular-polarizer 14 which, depending on its direction of rotation, either transmits or blocks the transmitted light. In the switched-on state, the cell 13 so changes the state of polarization of the light that the circular polarizer 14 now blocks the previously transmitted light or transmits the previously blocked light.

We claim:

1. A light control system consisting of a liquid crystal cell and polarizer combination, characterized by means (3) for supplying circularly polarized light to the liquid crystal cell (9) and by the liquid crystal cell being a TN rotatory cell having a minimum optical path difference between the switched-off and the switched-on states $\delta_{min} = \Delta n \cdot d = \lambda/2$.

2. A light control system according to claim 1, characterized in that the means for supplying circularly-polarized light comprises a circular polarizer (3).

3. A light control system according to claim 1, characterized in that the means for supplying circularly-polarized light comprises a wavelength-selectively reflecting cholesteric iquid crystal layer.

4. A light control system consisting of a liquid crystal cell and polarizer combination, characterized by means (3) for supplying circular polarized light to the liquid crystal cell (7) and by the liquid crystal cell being a TN rotatory cell having a minimum optical path difference between the switched-off and the switched-on states $\delta_{min} = \Delta n \cdot d = \lambda/4$.

5. A light control system according to claim 4, characterized in that the means for supplying circularly-polarized light comprises a circular polarizer (3).

6. A light control system according to claim 4, characterized in that the means for supplying circularly-polarized light comprises a wavelength-selectively reflecting cholesteric liquid crystal layer.

7. A light control system consisting of a liquid crystal cell and polarizer combination, characterized by circular-polarizer means for supplying circularly-polarized light to said liquid crystal cell, said means comprising a wavelength-selectively reflecting cholesteric liquid crystal layer consisting of monomeric and polymeric cholesteric liquid crystals.

8. A light control system according to claim 7, characterized in that the liquid crystal cell comprises a supertwist liquid crystal.

9. A light control system according to claim 7, characterized in that the liquid crystal cell (11) comprises a planar liquid crystal with a parallel molecular orientation.

10. A light control system according to claim 7, characterized in that the liquid crystal cell is a DAP-cell (13) with an isotropic molecular orientation.

11. A light control system according to claim 7, characterized in that a reflector (10) is disposed on a substrate of the liquid crystal cell.

12. A light control system comprising:
  a. a liquid crystal cell,
  b. circular-polarizer means for supplying circularly-polarized light, said means comprising a wavelength-selectively reflecting cholesteric liquid crystal layer consisting of monomeric and polymeric cholesteric liquid crystals,
  c. a $\lambda/4$ plate following the circular-polarizer means for converting circularly-polarized light from the circular-polarizer means into substantially linearly-polarized light, and
  d. a low-polarization linear polarizer in the path of the rays of the light following the $\lambda/4$ plate to improve the linear polarization without appreciably affecting the brightness of the system.

* * * * *